US009804988B1

(12) United States Patent
Ayoub et al.

(10) Patent No.: US 9,804,988 B1
(45) Date of Patent: Oct. 31, 2017

(54) DEVICE FULL MEMORY ACCESS THROUGH STANDARD PCI EXPRESS BUS

(71) Applicant: Amazon Technologies, Inc., Seattle, WA (US)

(72) Inventors: Hani Ayoub, Majd al-Krum (IL); Adi Habusha, Moshav Alonei Abba (IL); Ronen Shitrit, Kiryay Atat (IL)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 14/928,990

(22) Filed: Oct. 30, 2015

(51) Int. Cl.
*G06F 13/40* (2006.01)
*G06F 13/42* (2006.01)
*G06F 13/28* (2006.01)

(52) U.S. Cl.
CPC .......... *G06F 13/4022* (2013.01); *G06F 13/28* (2013.01); *G06F 13/404* (2013.01); *G06F 13/4282* (2013.01); *G06F 2213/0024* (2013.01); *G06F 2213/0026* (2013.01)

(58) Field of Classification Search
CPC ................. G06F 13/404; G06F 3/0604; G06F 2213/0024; G06F 2213/0026
See application file for complete search history.

(56) References Cited

U.S. PATENT DOCUMENTS

| 2002/0194540 A1* | 12/2002 | Cheung | G06F 11/362 714/34 |
| 2014/0372657 A1* | 12/2014 | Jones | G06F 13/4027 710/313 |
| 2015/0339246 A1* | 11/2015 | Sakurai | G06F 13/28 710/308 |
| 2016/0162436 A1* | 6/2016 | Raghavan | G06F 13/28 710/308 |
| 2017/0054593 A1* | 2/2017 | Borikar | H04L 49/35 |

OTHER PUBLICATIONS

PCI Express, "PCI Express Base Specification," Revision 3.0, PCI-SIG® (Nov. 10, 2010), 860 pages.
(Continued)

*Primary Examiner* — Glenn A Auve
(74) *Attorney, Agent, or Firm* — Kilpatrick Townsend & Stockton LLP

(57) ABSTRACT

A method of transferring data between a host and a PCI device is disclosed. The method comprises mapping a fixed memory-mapping control block in a host memory of the host to a control register of a memory-mapping unit of the PCI device; mapping a dynamic data-access memory block in the host memory to a default memory block in a memory of the PCI device, wherein the memory-mapping unit translates an address between the dynamic data-access memory block and a memory block in the memory of the PCI device; and dynamically modifying a value in the control register of the memory-mapping unit through the fixed memory-mapping control block such that an address of the dynamic data-access memory block in the host memory is translated to a different address in the memory of the PCI device based on the modified value in the control register of the memory-mapping unit.

20 Claims, 13 Drawing Sheets

(56) References Cited

OTHER PUBLICATIONS

Salihun, Darmawan. System Address Map Initilizations in x86/x64 Architecture (Part 1): PCI-Based Systems. [online]. INFOSEC Institute, Sep. 16, 2013 [retrieved on May 24, 2017]. Retrieved from the Internet: <URL: http://resources.infosecinstitute.com/system-address-map-initialization-in-x86x64-architecture-part-1-pci-based-systems/ >.

Salihun, Darmawan. System Address Map Initilizations in x86/x64 Architecture (Part 2): PCI-Based Systems. [online]. INFOSEC Institute, Jan. 9, 2014 [retrieved on May 24, 2017]. Retrieved from the Internet: <URL: http://resources.infosecinstitute.com/system-address-map-initialization-x86x64-architecture-part-2-pci-express-based-systems/>.

\* cited by examiner

300

| Device ID | | Vendor ID | | 00h |
|---|---|---|---|---|
| Status | | Command | | 04h |
| Class Code | | | Revision ID | 08h |
| BIST | Header Type | Lat. Timer | Cache Line S. | 0Ch |
| Base Address Registers | | | | 10h |
| | | | | 14h |
| | | | | 18h |
| | | | | 1Ch |
| | | | | 20h |
| | | | | 24h |
| Cardbus CIS Pointer | | | | 28h |
| Subsystem ID | | Subsystem Vendor ID | | 2Ch |
| Expansion ROM Base Address | | | | 30h |
| Reserved | | | Cap. Pointer | 34h |
| Reserved | | | | 38h |
| Max Lat. | Min Gnt. | Interrupt Pin | Interrupt Line | 3Ch |

| | | | | Byte Offset |
|---|---|---|---|---|
| 31 | | | 0 | |
| Device ID | | Vendor ID | | 00h |
| Status | | Command | | 04h |
| Class Code | | | Revision ID | 08h |
| BIST | Header Type | Primary Latency Timer | Cache Line Size | 0Ch |
| Base Address Register 0 | | | | 10h |
| Base Address Register 1 | | | | 14h |
| Secondary Latency Timer | Subordinate Bus Number | Secondary Bus Number | Primary Bus Number | 18h |
| Secondary Status | | I/O Limit | I/O Base | 1Ch |
| Memory Limit | | Memory Base | | 20h |
| Prefetchable Memory Limit | | Prefetchable Memory Base | | 24h |
| Prefetchable Base Upper 32 Bits | | | | 28h |
| Prefetchable Limit Upper 32 Bits | | | | 2Ch |
| I/O Limit Upper 16 Bits | | I/O Base Upper 16 Bits | | 30h |
| Reserved | | | Capability Pointer | 34h |
| Expansion ROM Base Address | | | | 38h |
| Bridge Control | | Interrupt Pin | Interrupt Line | 3Ch |

*FIG. 4*

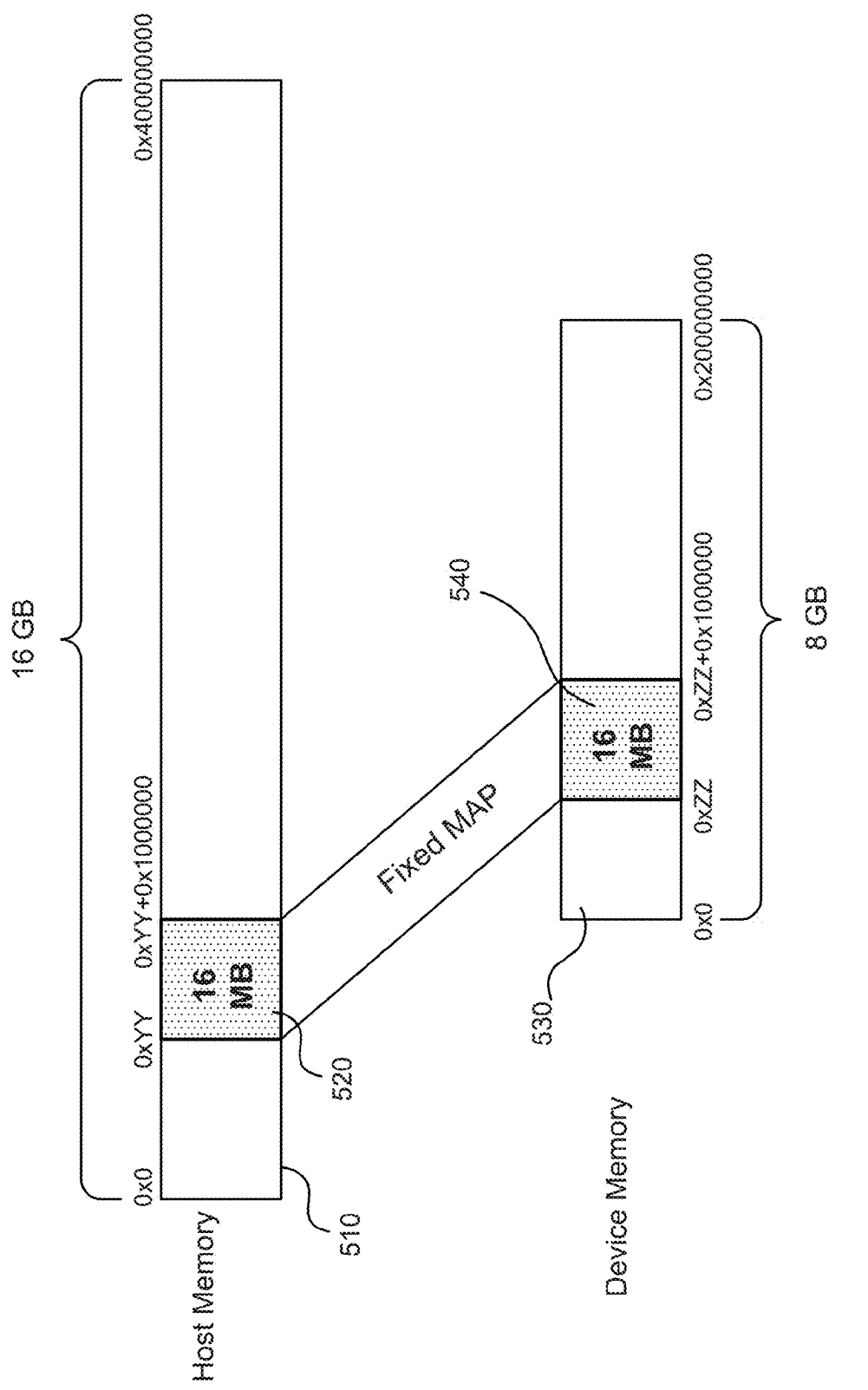

US 9,804,988 B1

DEVICE FULL MEMORY ACCESS THROUGH STANDARD PCI EXPRESS BUS

BACKGROUND

In many computer systems, peripheral devices are connected to the computing systems using interconnects. The interconnects may implement standard bus protocols, such as any of the Peripheral Component Interconnect (PCI) family of bus protocols. PCI express (PCIe) is an extension to PCI and has been used in most computer applications including enterprise servers, consumer personal computers (PC), communication systems, and industrial applications. PCIe uses a packet-based layered protocol, and is based on point-to-point topology, with a separate serial link connecting each endpoint device to a host.

A traditional PCIe device allows the host to access a small sized memory block of the device's memory, which prevents the host from accessing the rest of the device's memory. It is often desirable for the host to access the full memory space of an endpoint device for debugging, configuration or other purposes, while avoiding reserving a large memory space in the host memory.

BRIEF DESCRIPTION OF THE DRAWINGS

Various embodiments in accordance with the present disclosure will be described with reference to the drawings, in which:

FIG. 3 illustrates a map of PCI configuration register type 0 header;

FIG. 4 illustrates a map of PCI configuration register type 1 header;

FIG. 5 illustrates an example of memory mapping and accessing between a PCIe host and a PCIe device;

DETAILED DESCRIPTION

Figure 1:
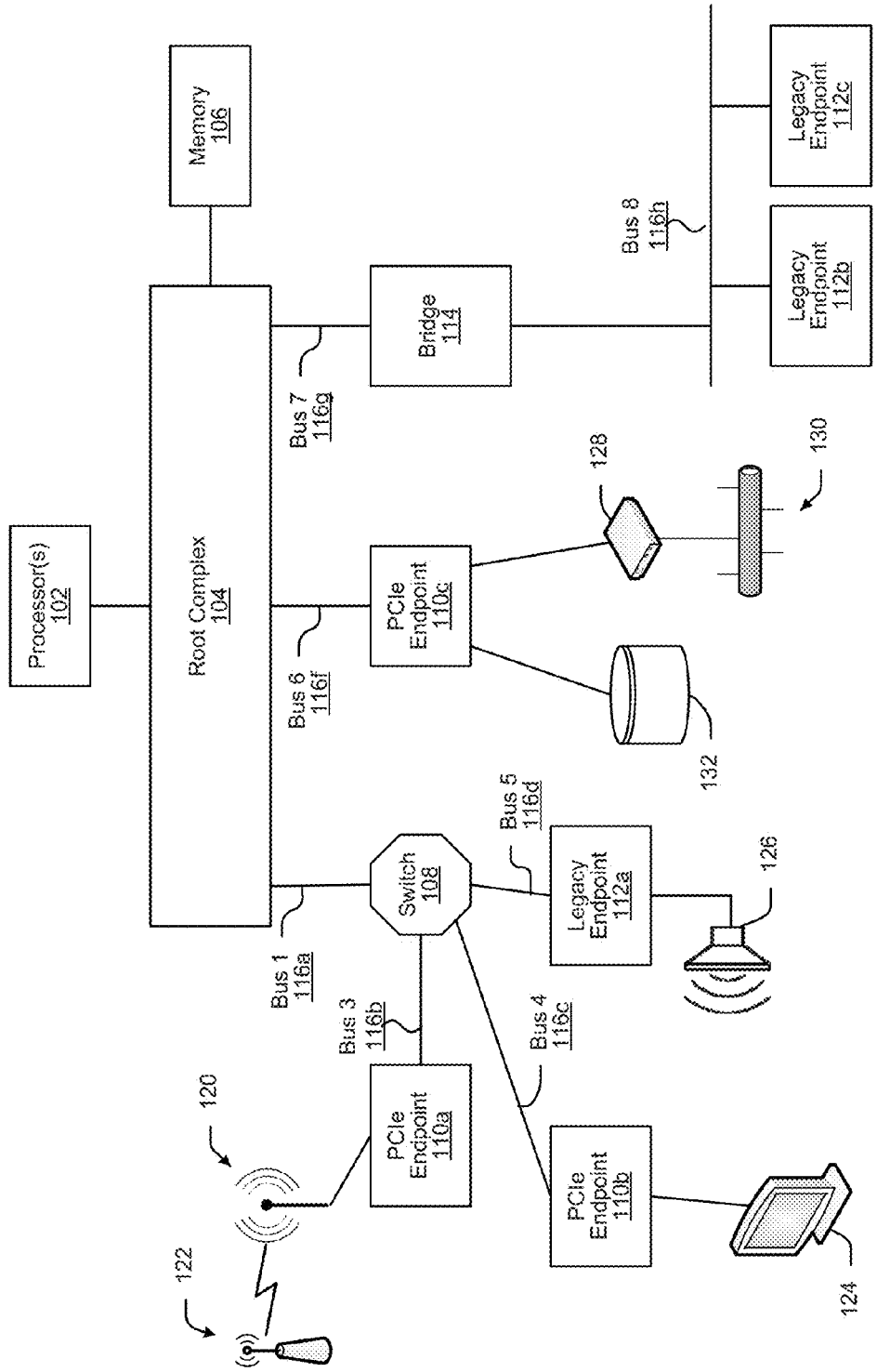
FIG. 1 illustrates an example of a computing system that includes multiple peripheral devices connected to the computing system through PCIe buses.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computing systems may include peripheral devices that add to or change the functionality of the computing system. Examples of peripheral devices include storage devices, input/output (I/O) devices such as displays and speakers, and wired and/or wireless network adapters, among others. In many cases, peripheral devices are connected to the computing system using interconnects implemented using different bus protocols.

Several different bus protocols have been developed for interconnecting various computer components, including "expansion" bus (XT bus), Industry Standard Architecture (ISA) bus (AT bus), Extended Industry Standard Architecture (EISA), Video Electronics Standards Association (VESA) bus, and Peripheral Component Interconnect (PCI) bus. The PCI specification allows multiple PCI-compliant expansion cards to be installed in slots constructed along the PCI bus.

An extension to the PCI specification referred to as PCI Express (or PCIe) has been created. PCIe provides PCI compatibility using established PCI programming models and further allows new hardware to take advantage of enhanced features. The PCIe architecture provides a low-pin count interface and support for multiple interconnect widths, new hot-plug cards, and higher transfer rates.

As used herein, the term "PCI" describes a family of related, standardized bus protocols. PCI includes the original PCI standard, PCI-eXtended (PCI-X), Accelerated Graphics Port (AGP), PCI Express (PCIe, also referred to as PCI-XP), and other extensions to the PCI standard. The term "PCI" as used herein may be used to describe any protocol in the PCI family of bus protocols. Even though specific embodiments may be provided using PCIe as examples, the methods and techniques described herein may be applied to any system implementing any protocol in the PCI family of bus protocols.

In a PCI system, a host may only access a reserved block of device memory, the size and location of which are configured during the initialization or enumeration of the PCI system. To read or write between the reserved device memory block and the reserved host memory block that is mapped to the reserved device memory block, a translation agent on the device is used to translate addresses in the device memory space to addresses in the host memory space, or translate addresses in the host memory space to addresses in the device memory space. In a modern system-on-chip (SOC) device, a large memory is generally used. In many cases, to avoid reserving a large mapped host memory for a device, the reserved block of device memory is limited in size and/or fixed in address location. Thus, the host may only access a small portion of the memory space on a PCI device.

Techniques described herein allow a host in a PCI system to access the full memory of a device without reserving a large memory space in a host memory. In various embodiments, a memory-mapping unit, such as a PCI internal Address Translation Unit (iATU), can be reserved on a device for host-device memory mapping. A small memory block, such as a memory block of a few bytes or less than 100 bytes, can be reserved in the host memory and mapped to a device memory block for control register(s) of the device's memory-mapping unit. This small memory block, referred as a fixed memory-mapping control block for host-device control, can be used by the host to control the memory-mapping unit on the device. A relatively small memory block, such as a memory block of about 1 megabyte (MB), can be reserved in the host memory as a dynamic data-access memory block for reading a block from the device memory. By controlling the control register(s) of the memory-mapping unit through the fixed memory-mapping control block, the host may dynamically map the dynamic data-access memory block to a memory block at a different location in the device memory.

More specifically, to access a desired device memory block that is not within a range specified by any base address register (BAR), a host uses a BAR and the fixed memory-mapping control block to control the memory-mapping unit, such that the dynamic data-access memory block can be dynamically mapped to a desired device memory block. In this way, any desired memory block in the device memory space may be accessible by the host. In some embodiments, a device memory block can also be dynamically configured or unmapped through the memory-mapping unit to prevent other devices from accessing the device's memory, for example, for security reasons.

I. PCIE SYSTEM

PCIe (Peripheral Component Interconnect Express) is an extension to PCI and PCI-eXtended (PCI-X). It has been used in many computer applications such as enterprise servers, consumer personal computers (PC), communication systems, and industrial applications. Unlike PCI bus topology, which uses shared parallel bus architecture, PCIe is based on point-to-point topology, with separate serial links connecting every device to a root complex (host). A PCIe link supports full-duplex communication between two endpoints. Data can flow upstream and downstream simultaneously. Each pair of these dedicated serial point-to-point connections is called a lane. A PCIe link between two devices may include 1 to 32 lanes. PCIe uses a packet-based layered protocol, including a transaction layer, a data link layer, and a physical layer. Packet data is striped across lanes, and the lane count is automatically negotiated during device initialization. The PCIe standard defines slots and connectors for multiple widths: ×1, ×4, ×8, ×16 or ×32. This allows PCIe to support lower throughput, cost-sensitive applications as well as performance-critical applications. There are basically three different types of devices in a PCIe system: root complexes (RCs), PCIe switches, and endpoints (EPs).

A. System Architecture

FIG. 1 illustrates an example of a computing system 100 that includes multiple peripheral devices interconnected through PCIe buses. The peripheral devices may include hardware devices and/or devices that include a combination of hardware and software that can be attached to computing system 100 to add functionality to computing system 100. Examples of peripheral devices include storage devices, displays, speakers, wired and/or wireless network adapters, adapters to provide additional ports, bridges, hubs, switches that provide ports for additional peripheral devices, and others. Generally, the peripheral devices can be connected and disconnected from computing system 100 to change the functionality of computing system 100. In some cases, computing system 100 must be powered down for a peripheral device to be added or removed. In other cases, a peripheral device can be attached or removed while computer system 100 is powered on (often referred to as "hot-swapping" or "hot-plugging").

Computing system 100 includes peripheral devices that implement one or more variations of Peripheral Component Interconnect (PCI) standard bus protocols. A bus may be a communication channel that transfers data within a computing system, or between a computing system and other devices. A standardized bus protocol may be a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" may be used to describe any protocol in the PCI family of bus protocols.

As shown in FIG. 1, computing system 100 may include one or more processors 102, a root complex 104, a memory subsystem 106, a switch 108, a bridge 114, and a number of peripheral devices (or PCIe endpoint devices). Root complex 104 may be referred to as a host bridge. Root complex 104 and its associated processors and memory may be referred to as a host. PCIe switches, bridges and endpoint devices may be referred to as PCIe devices. In this example, the peripheral devices include PCIe endpoints 110a-c and legacy endpoints 112a-c. Processors 102 may be any general purpose computing devices capable of executing software code. Processor 102 may include multiple processing cores.

There is typically a single root complex in a PCIe system. A root complex may include one or more root ports, one or more CPUs, and their associated RAM and memory controller, as well as other interconnect and/or bridging functions. The root complex is similar to a north-bridge in a PCI-based system. It acts as a "glue" logic to connect PCIe devices to main memory (RAM), and the CPU. In many cases, the root complex also provides high speed PCIe connection to a GPU. The root complex can be implemented as a part of the north-bridge in systems that employ two physical chips for chipset logic. In many embodiments, the root complex may be integrated into a CPU chip. The root complex is connected to PCIe devices through root ports. In some embodiments, the root complex and the root ports may be implemented in a single chip. In some other embodiments, the root ports and the root complex may be implemented in different chips. For example, the root complex may reside in a CPU, while the root ports may be located in a chipset.

Root complex 104 in FIG. 1 may be a hardware device or a hardware and software device that connects processors 102 and memory subsystem 106 to the peripheral devices. PCIe devices may be connected directly to root complex 104. For example, PCIe endpoint 110c is connected directly to root complex 104. Alternatively or additionally, the PCIe devices may be connected to root complex 104 through switch 108. Bridge 114 may also be connected to root complex 104. Root complex 104 may forward transactions to processors 102 and direct responses from processors 102 back to the PCIe devices. Root complex 104 may further generate transactions on behalf of processors 102, and forward responses to those transactions back to processors 102. In some cases, root complex 104 may also route transactions from one PCIe device to another, and/or between PCIe devices, switches, and bridges. Root complex 104 may provide services for computer system 100, such as a hot plug controller, a power management controller, an interrupt controller, and/or error detection and reporting. In some implementations, root complex 104 may be implemented as part of a host system that includes one or more integrated processors and memory.

Memory subsystem 106 provides temporary or long-term storage for data that may be used by computing system 100. Memory subsystem 106 may include Dynamic Random Access Memory (DRAM), Synchronous DRAM (SDRAM), and/or Double Data Rate (DDR), among others. In some cases, memory subsystem 106 may also include Read Only Memory (ROM), such as Programmable Read Only Memory (PROM), Erasable Programmable Read Only Memory (EPROM), Electrically Erasable Programmable Read Only Memory (EEPROM), and/or Flash EEPROM, among others. In some implementations, root complex 104 may include a memory controller to manage transactions to and from memory subsystem 106. In other implementations, processors 102 may include a memory controller. Alternatively or additionally, computing system 100 may include an external memory controller in communication with either processors 102, root complex 104, or both processors 102 and root complex 104, and memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, that is, peripheral devices that are configured to communicate using the PCIe protocol. A PCIe endpoint device is a PCIe device that terminates a PCIe link. The PCIe endpoint device only has one connection to the PCIe system topology, but may have a connection to another kind of bus, though. For example, a PCIe network card in most cases is an endpoint device, just as PCIe storage controller, etc. A PCIe endpoint device can also act as a bridge to legacy/compatibility bus, such as a PCIe-to-PCI bridge, or a bridge to a low pin count (LPC) bus, etc.

A PCIe switch is a device that connects two or more PCIe links. A PCIe switch may include several virtual PCI-to-PCI bridges internally, and behave as multiple PCI-PCI bridges, decoupling upstream and downstream ports so that each link can work as a point-to-point connection. Switch 108 in FIG. 1 functions as a multi-port connecter between various devices, including root complex 104, peripheral devices, and possibly other switches and bridges. Switch 108 may route transactions between any of the devices connected to it. For example, switch 108 may route transactions between PCIe endpoints 110a-b and legacy endpoint 112a, and between various endpoints 110a-b, 112a and root complex 104. Switch 108 may also provide arbitration to prioritize incoming and outgoing transactions. Devices connected to switch 108 may treat switch 108 as another requester and/or completer. Though not illustrated here, switches can also be connected to other switches to further expand the number of peripheral devices that can be connected to computing system 100.

Bridge 114 may provide connectivity to other buses or switching fabrics. The other buses or switching fabrics may implement a PCI variant or another protocol. For example, in the example of FIG. 1, bridge 114 provides connectivity to a bus implementing the original PCI standard. Bridge 114 may include mechanisms to translate from one bus protocol, such as the original PCI standard, to another protocol, such as PCIe.

Components in computing system 100 may be connected through a shared bus. For example, in the illustrated example, legacy endpoints 112b-c are connected to a shared PCI bus 116h. Alternatively or additionally, peripheral devices may be connected to computing system 100 in a switching fabric topology. The interconnected devices illustrated in FIG. 1, including root complex 104, switch 108, bridge 114, and PCIe endpoints 110c, form an example of a switching fabric. A switching fabric topology may include point-to-point connections between the devices connected to the fabric, and may include a routing system for passing messages between the devices. In a switching fabric, transactions may be spread across multiple physical links. In the example in FIG. 1, switch 108 is connected to root complex 104 through bus 1 116a and PCIe endpoint 110c is connected to root complex 104 through bus 6 116f. Similarly, bridge 114 is connected to root complex 104 through bus 7 116g. Each of PCIe endpoints 110a-b and legacy endpoint 112a are also connected to switch 108 through individual buses 116b-d. The connections between each of root complex 104, switch 108, bridge 114, PCIe endpoints 110a-c and legacy endpoint 112a are point-to-point connections because each of buses 116a-g are not shared with another device. Furthermore, a packet directed from one device to another (for example, from root complex 104 to PCIe endpoint 110a) is routed directly to its destination.

In some embodiments, the connections between the devices in computing system 100 may be numbered. For example, in the illustrated example, the connection between switch 108 and root complex 104 is labeled bus 1 116a (bus 0 may be internal to root complex 104). Similarly, each of the buses connecting PCIe endpoints 110a-b and legacy endpoint 112a to switch 108 are labeled bus 3 116b, bus 4 116c, and bus 5 116d, respectively (bus 2 may be internal to switch 108). Furthermore, the connection between root complex 104 and PCIe endpoint 110c may be labeled bus 6 116f, while the connection between root complex 104 and bridge 114 may be labeled bus 7 116g. Finally, the shared bus downstream from bridge 114 may be labeled bus 8 116h. In most cases the numbers of the buses are arbitrary, though bus numbers may generally be assigned in a logical fashion. For example, bus 0 may be located within root complex 104, and the bus label may increment as the distance between the bus and root complex 104 increases.

As noted above, peripheral devices may add to and/or modify the functionality of computing system 100. For example, one PCIe endpoint 110a may implement a Wi-Fi adapter 120. Using Wi-Fi adapter 120, computing system 100 may be able to communicate wirelessly with a wireless access point 122, to access a network. As another example, PCIe endpoint 110b may implement a video card. A video card may include a port to connect a monitor 124 or other display devices. As a further example, computing system 100 may include a legacy endpoint 112a that implements a sound card. A sound card may include a port or jack that accepts a plug for a speaker 126 or other audio output devices.

The hardware and/or software components in a peripheral device that provide the functionality of, for example, a network interface or a storage controller may be called a "function." Types of functions that may be provided by a peripheral device include, for example, mass storage controllers, network controllers, display controllers, multimedia devices, memory controllers, bridges, input devices, docking stations, serial bus controllers, wireless controllers, satellite communications controllers, and encryption/decryption controllers, among others.

In some cases, a PCIe endpoint may be a multi-function device, that is, a device that provides the functionality of multiple devices. For example, PCIe endpoint 110c may include an Ethernet adapter, and provide a connection to a gateway device 128, such as a DSL or cable modem. PCIe endpoint 110c may also include a storage adapter, and provide a connection to a storage device 132. PCIe endpoint 110c thus may provide access to both a network 130 and storage device 132.

Figure 2:
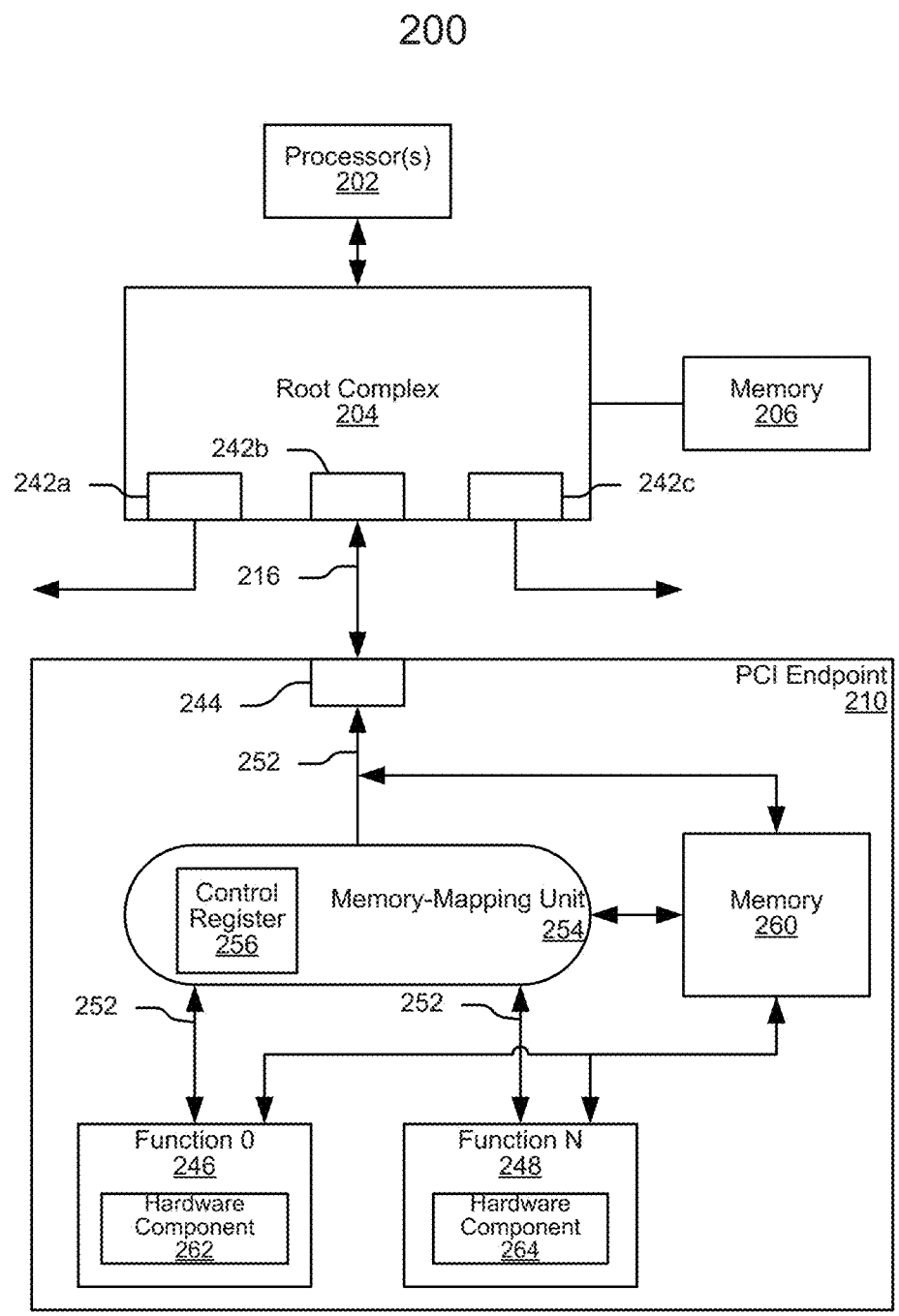
FIG. 2 illustrates an example of a computing system including at least one PCI endpoint.

FIG. 2 illustrates an example of a computing system 200 including at least one PCI endpoint 210. FIG. 2 further illustrates an example of the internal components and operation of PCI endpoint 210. In this example, PCI endpoint 210 is in communication with a root complex 204 over a PCI interconnect 216. Root complex 204 may be in communication with one or more processors 202 and a memory subsystem 206. Root complex 204 may include one or more ports 242a-c. Ports 242a-c may be connected, using additional PCI interconnects, to PCI switches, bridges, and endpoints, including the illustrated PCI endpoint 210. Root complex 204 may route transactions between processors 202 and any of the endpoints, switches, or bridges, or between the endpoints, switches, and bridges themselves. In this example, PCI is used as an example of a bus protocol that may be implemented by a computing system to connect to peripheral devices. It is understood that the example illustrated in FIG. 2 may apply to other bus protocols that may be used to connect peripheral devices to a computing system.

Processors 202 may be general purpose computing devices that are capable of executing software code. A processor may include multiple processing cores. Memory subsystem 206 provides temporary or long-term storage for data that may be used by computing system 200.

PCI endpoint 210 in this example includes a port 244, a memory 260, a memory-mapping unit 254, function 0 246 to function N 248, and an internal interconnect 252 that connects functions 246 to 248, memory 260, memory-mapping unit 254 and port 244. Port 244 may include a physical interface for connecting to a cable, socket, port, or other connection to PCI interconnect 216.

Memory-mapping unit 254 translates between an address in memory subsystem 206 and an address in a local memory space in PCI endpoint 210. Local memory space in PCI endpoint 210 includes memory 260 and memory blocks in other functional units in PCI endpoint 210. Memory-mapping unit 254 includes a control register 256 which may store values and settings used for address translation. Control register 256 may be mapped to the local memory space and may have an associated address in the local memory space in PCI device 210.

Function 0 246 and function N 248 may include hardware components 262 and 264, respectively. Hardware component 262 or 264 may include control registers (not shown), which may be mapped to local memory space in PCI endpoint 210. Function 0 246 and function N 248 may also include various software components.

B. Initialization and Enumeration

In a PCIe system, data is routed based on memory address or ID, depending on transaction types. Within a PCIe system, all devices share a same system memory space, and each is assigned a block or region in the system memory space. The block or region for each PCIe device may be identified by base address register(s) (BAR) of each device in the device's configuration register header. Therefore, every PCIe device must be uniquely identified and configured within a PCIe system. This may be done by an enumeration process. During system initialization, the root complex of the PCIe system performs the enumeration process to determine various buses that exist and various PCIe devices that reside on each bus, as well as a required address space for each PCIe device. The root complex allocates bus numbers to PCIe buses and configures the bus numbers to be used by PCIe switches. The enumeration process reserves bus numbers and address space for empty slots. All PCIe switches and endpoints within the system domain are detected at the end of the enumeration process.

For example, when a computing system such as computing system 100 in FIG. 1 initially powers up, processors 102 may be unaware of any peripheral devices that are connected to the system. Processors 102 may be aware of root complex 104, and possibly also that root complex 104 is connected to one or more buses. To learn about the rest of the PCIe system, processors 102 may execute a process to scan and configure the system. This process may be referred to as an enumeration process. The specific process of scanning for, locating, and identifying peripheral devices may be called discovery or discovering. During an enumeration process, software executing on processors 102 may first scan each of buses 116a, 116f, 116g connected to root complex 104, and identify switch 108, PCIe endpoint 110c, and bridge 114. Upon discovering switch 108, processors 102 may next scan buses 116b-d connected to switch 108. Processors 102 thereby discover PCIe endpoints 110a-c and legacy endpoint 112a. Upon discovering bridge 114, processors 102 may also scan bus 8 116h; however, bridge 114 may translate the scanning instructions to the protocol implemented by bus 8 116h.

Root complex 104 is also in charge of setting base address registers (BARs) of each device during initialization or enumeration. A PCIe system typically includes a memory address space and an L/O address space. The memory address space and the I/O address space of the host may be subdivided into multiple address space blocks. Each of the address space blocks may be assigned to a PCIe device and mapped to a block in the device's address space. These address space blocks may each be assigned a base address, where the base address specifies the region of host address space that is assigned to a device.

During or after the enumeration process, the root complex processor assigns memory address space to each PCIe device in the system domain. In some implementations, the memory address space assigned to a device may be stored in a configuration register in the device. Software executing on processors 102 may be responsible for managing all available memory, and, for example, ensuring that no two devices are assigned overlapping memory regions. Alternatively or additionally, memory may be managed by a memory controller. The absolute memory address range in the system memory allocated to a PCIe device may be based on which slot the PCIe device is plugged into. A PCIe device may be assigned a default size, such as 16 MBs of memory space. If a PCIe device requests more memory space, the memory assignment may be adjusted accordingly. The corresponding memory space is assigned to an endpoint by writing the address of the assigned memory space to its BAR.

While scanning the buses, or possibly after, processors 102 may also transmit configuration transactions to each of the devices it discovers. The configuration may include, for example, assigning the memory address space and the I/O address space. The configuration may further include programming information, such as a bus number and/or a device number, into configuration registers in the devices. During the configuration, processors 102 may also read information from configuration registers in the device. In most implementations, the configuration registers are included in the hardware of a device.

In some embodiments, switch 108 and bridge 114 also include a configuration space with configuration registers. In such embodiments, processors 102 may read configuration registers in switch 108 and bridge 114. Switch 108 and bridge 114 may also be configured by processors 102, for example, with bus and device numbers, and base address registers.

II. PCIE MEMORY ACCESS

In a PCIe system, address routing is used to transfer data to or from memory, memory mapped I/O, or I/O locations between devices. There may be two address domains in a PCIe system. A system domain is the global address domain as seen by the root complex. A local domain is the address as seen by a local endpoint device. These two domains are independent of each other. The root complex is free to assign address space in the system domain and the local endpoint device can freely assign address space in its local domain. In order to bridge address space between the system domain and the local domain, the endpoint device may support address translation between the two domains.

In a PCIe system, a root complex or host is responsible for the allocation of memory addresses for the system domain. An endpoint is responsible for the allocation of memory addresses for its local domain. In the system domain, the root complex or host reserves a block of memory address space for all endpoint devices. This reserved block of memory may be divided into smaller blocks. Each smaller block is reserved for one endpoint device that connects to the host.

Whenever the root complex detects an endpoint in a particular slot (or port of the PCIe switch) during system initialization, the root complex assigns an address space to the endpoint. The starting address, size of the address block that is reserved per slot, and the number of PCIe ports in the system could be adjusted based on system architecture. The starting address for a range of addresses assigned to a device may be written in a base address register in the device's configuration register header.

An endpoint is responsible for the address map of its local domain. This may be independent of the memory map of the system domain. A memory-mapping unit, such as an address translation unit, may reside in the endpoint to translate address space between the system domain and the local domain.

A. Base Address Register

BARs are parts of PCIe configuration register and are implemented on all PCIe devices which require system memory, IO, or memory mapped IO (MMIO) addresses allocated to them. Every PCIe device must implement the PCIe configuration register according to the PCIe specification. Otherwise, the device will not be regarded as a valid PCIe device. A BAR is used for allocating one block of prefetchable or non-prefetchable memory, or a block of 10 addresses in the system memory or IO map for a device. Prefetchable means that the contents of the memory addressed by the BAR can be fetched before a request to that specific memory address is made. This feature can be used to improve the overall PCI device memory read speed.

The PCIe configuration register controls the behavior of the PCIe device at all times. Changing a value in the PCIe configuration register may change the behavior of the system. The PCIe configuration register consists of 256 bytes of registers, from (byte) offset 00h to (byte) offset FFh. The 256-byte PCIe configuration register includes two parts, the first 64 bytes are called PCIe configuration register header and the rest of the bytes are called device-specific PCIe configuration register. BARs are generally located in the PCIe configuration register header. BARs affect the mapping between a PCIe device memory and a system memory.

There are two types of PCIe configuration register headers, a type 0 header and a type 1 header. The PCIe root ports, switches, and bridges use PCIe configuration register type 1 header, while PCIe endpoint devices use the PCIe configuration register type 0 header. FIG. 3 shows a map of PCI configuration register type 0 header. FIG. 4 shows a map of PCI configuration register type 1 header. As shown in FIG. 3 and FIG. 4, a type 0 configuration register header has 6 BARs available for the device, while a type 1 header has only two BARs. Each BAR is a 32-bit register, thus each of them can map PCI device memory in a 32-bit system address map, i.e., can map the PCI device memory to the 4 GB memory address space. A pair of adjacent BARs can be concatenated if a 64-bit memory request is being made.

B. Address Translation

As described above, there may be two address domains in a PCIe system: the system domain as seen by the root complex, and the local domain as seen by a local endpoint. To avoid memory address conflicts, a typical implementation uses address translation between the system and local domains.

An endpoint supports both inbound and outbound address translation. Transactions initiated on the system domain and targeted on an endpoint's local domain are referred to as inbound transactions. Transactions initiated on an endpoint's local domain and targeted at the system domain are referred to as outbound transactions. During inbound transactions, a memory-mapping unit, such as an inbound Address Translation Unit (ATU), converts a system domain address to a local domain address of an endpoint. During outbound transactions, an outbound memory-mapping unit converts an endpoint's local domain address to a system domain address and initiates the data transfer on the system domain. When the endpoint accesses any local address space that falls within a window, the memory-mapping unit forwards the request to the system domain. The local address is also translated into the system domain address space.

An inbound memory-mapping unit in an endpoint may allow initiators in the system domain to directly access the local memory domain within an address range. The endpoint sets up the inbound and outbound memory-mapping units to translate addresses between its local domain and the system domain. When the endpoint receives a memory request from the system domain, it receives the packet only if the address in the packet header is within the memory range assigned to the endpoint in the system domain. If the requested address is within a system address window, the request packet is forwarded from the system domain to the local domain. The address field in the request packet is also translated to an inbound local address. The inbound local address may represent a local buffer in memory that the endpoint will read or write in response to the request from the system domain, or it may represent a local register that affects the endpoint directly.

When an endpoint needs to access any address space in the system domain, it accesses an address within an outbound address window specified by the BAR register of the endpoint. When the endpoint detects that the requested address falls within the outbound address window, it forwards the request to the system domain and the address in the request is also translated from the local domain to the system domain address space.

III. DYNAMIC MEMORY MAPPING

In a PCIe system, a host reserves a block or a region of host memory space to access a corresponding assigned or reserved memory block on a PCIe device for data transfer. Similarly, the PCIe device uses the corresponding reserved memory block on it to access the reserved block of the host memory for data transfer. The starting address of the reserved memory block is specified in a base address register in the device's configuration register header. Typically, a plurality of PCIe devices may exist in a PCIe system. Thus, a small memory block is usually reserved for each device to avoid occupying a large host memory space.

FIG. 5 illustrates an example of memory mapping and accessing between a PCIe host and a PCIe device. As shown in FIG. 5, a host memory 510 may include 16 gigabytes (GBs) of memory space from address 0x0 to 0x400000000, among which 16 MBs are reserved for the PCIe device during initialization or enumeration. In host memory 510, the reserved 16-MB memory block 520 starts at address 0xYY and ends at address 0xYY+0x1000000. In a device memory 530, the corresponding reserved 16-MB memory block 540 starts at address 0xZZ and ends at address 0xZZ+0x1000000. The host can only access memory block 540 from address 0xZZ to address 0xZZ+0x1000000 in device memory 530. Similarly, the device can only access memory block 520 from address 0xYY to address 0xYY+0x1000000 in host memory 510. The starting address 0xYY of the reserved memory block 520 may be written in the BAR in the device's configuration register. In some embodiments, a block of host memory may be divided into a plurality of sub-blocks, where each sub-block is reserved for one of a plurality of PCIe devices.

When the host needs to read data from memory block 540 in device memory 530, the host sends a request with the host memory address to the device. The device checks the host memory address in the request packet header against the address of reserved memory block 520 specified by the BAR. If the request address falls within reserved memory block 520, the device translates the host memory address to the device memory address using internal memory-mapping unit and sends the data at the device memory address in the device memory to the host in packets. When the host needs to write data into memory block 540 of the device, the host sends the data with the host memory address to the device in packets. The device checks the host memory address against the address of reserved memory block 520 specified by the BAR. If the host memory address falls within reserved memory block 520, the device translates the host memory address to the device memory address using internal memory-mapping unit and writes the data to the device memory at the device memory address. In this way, the host reads from or writes to memory block 520 in host memory 510 as if it were reading from or writing to memory block 540 in device memory 530.

The device may access host block 520 in a similar way, such that the device reads from or writes to memory block 540 in device memory 530 as if it were actually reading from or writing to memory block 520 in host memory 510.

With such configuration, the host and the device can only exchange data in the reserved memory blocks, which is usually limited in size and fixed in location. In some applications, it may be desirable to access the full memory of a device by a host for debugging or other purposes. To access a large block of memory in the host or the device, a large memory block needs to be reserved at the host, which is generally impractical.

Figure 6:
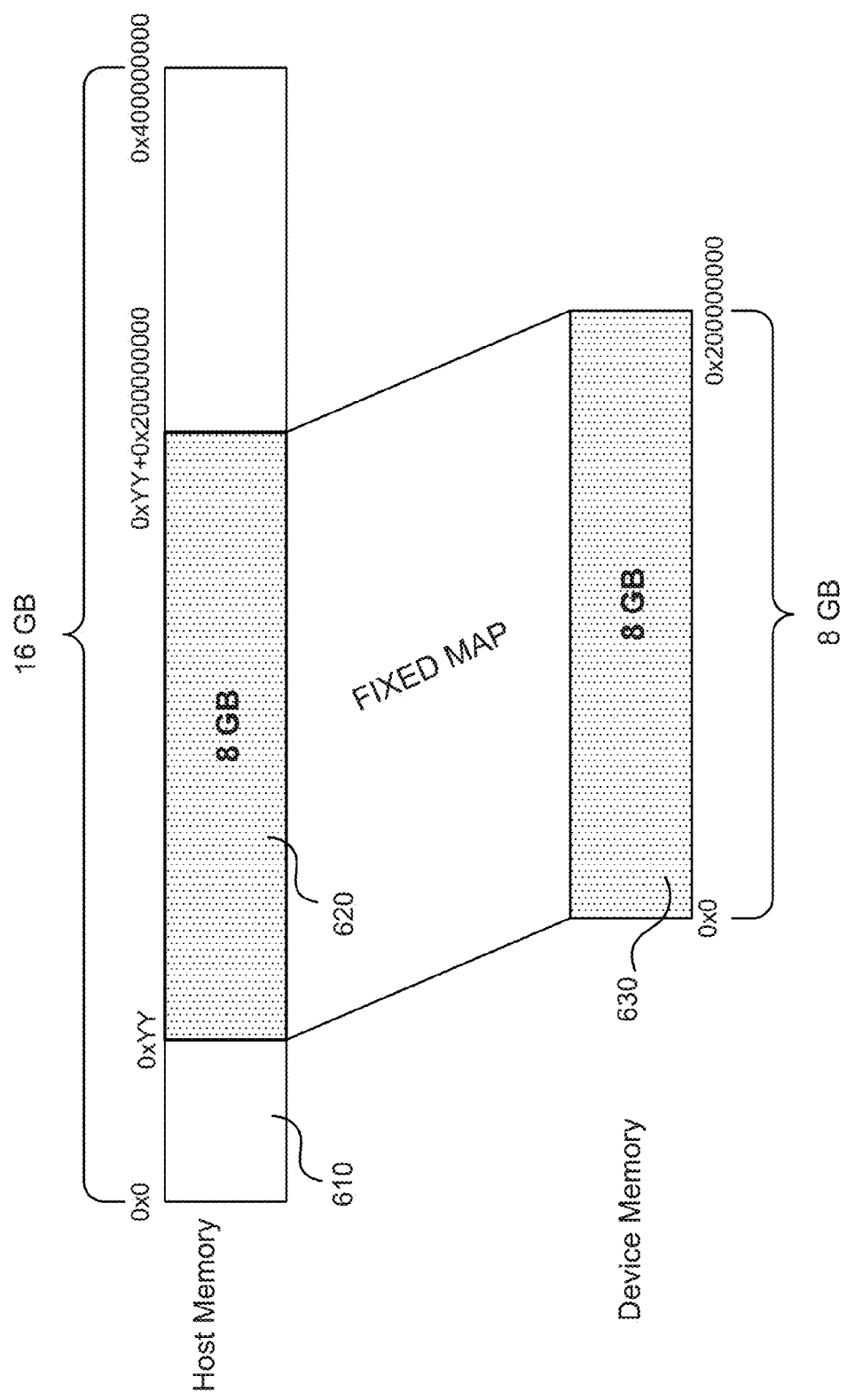
FIG. 6 illustrates another example of memory mapping and accessing between a PCIe host and a PCIe device.

FIG. 6 illustrates an example of memory mapping and accessing between a PCIe host and a PCIe device, where a large memory block 620 is reserved in host memory 610. As shown in FIG. 6, the device has a total of 8 GBs of memory 630. To access the full 8 GBs of device memory 630, a 8-GB block 620 of host memory space is reserved in host memory 610. Block 620 starts at address 0xYY and ends at address 0xYY+0x200000000, which occupies a half of the 16-GB space of host memory 610. To access device memory 630, a memory-mapping unit on the device is used to translate between host memory addresses and device memory addresses as described above. This method may allow the host to access the full device memory 630, but requires a large memory block 620 to be reserved in host memory 610.

Techniques described in various embodiments of the present disclosure allow a host in a PCI system to access the full memory space of a PCI device without having to reserve a large memory space in the host memory. In various embodiments, a memory-mapping unit, such as a PCIe internal Address Translation Unit, is reserved on a device for host-device memory mapping. A small memory block, such as a block of a few bytes, for example, 4 bytes or 8 bytes, is reserved in the host memory and mapped to a control register(s) of the device's memory-mapping unit, where the control register(s) of the device's memory-mapping unit may be mapped to a device memory block or located in a device memory block. This small memory block, referred to as a fixed memory-mapping control block for host-device control, can be used by the host to control the memory-mapping unit on the device. A relatively small memory block, such as a block of about 1 MB, can be reserved in the host memory as a dynamic data-access memory block for reading a memory block from the device. By controlling the control register(s) of the memory-mapping unit through the fixed memory-mapping control block, the host may dynamically map the dynamic data-access memory block to a memory block at a different location in the device memory such that the location of the mapped memory block in the device memory can be changed during operation, repeatedly, continuously, or otherwise without re-initialization or reconfiguration.

More specifically, to access a desired device memory block that is not within a range specified by any base address register (BAR), a host uses the fixed memory-mapping control block to control the device's memory-mapping unit, such that the dynamic data-access memory block can be mapped to the desired device memory block using a BAR specified in the device's configuration register. In this way, any desired memory block in the device memory space may be accessible using a PCI BAR and the fixed memory-mapping control block, which is mapped to the control registers of the memory-mapping unit.

Figure 7:
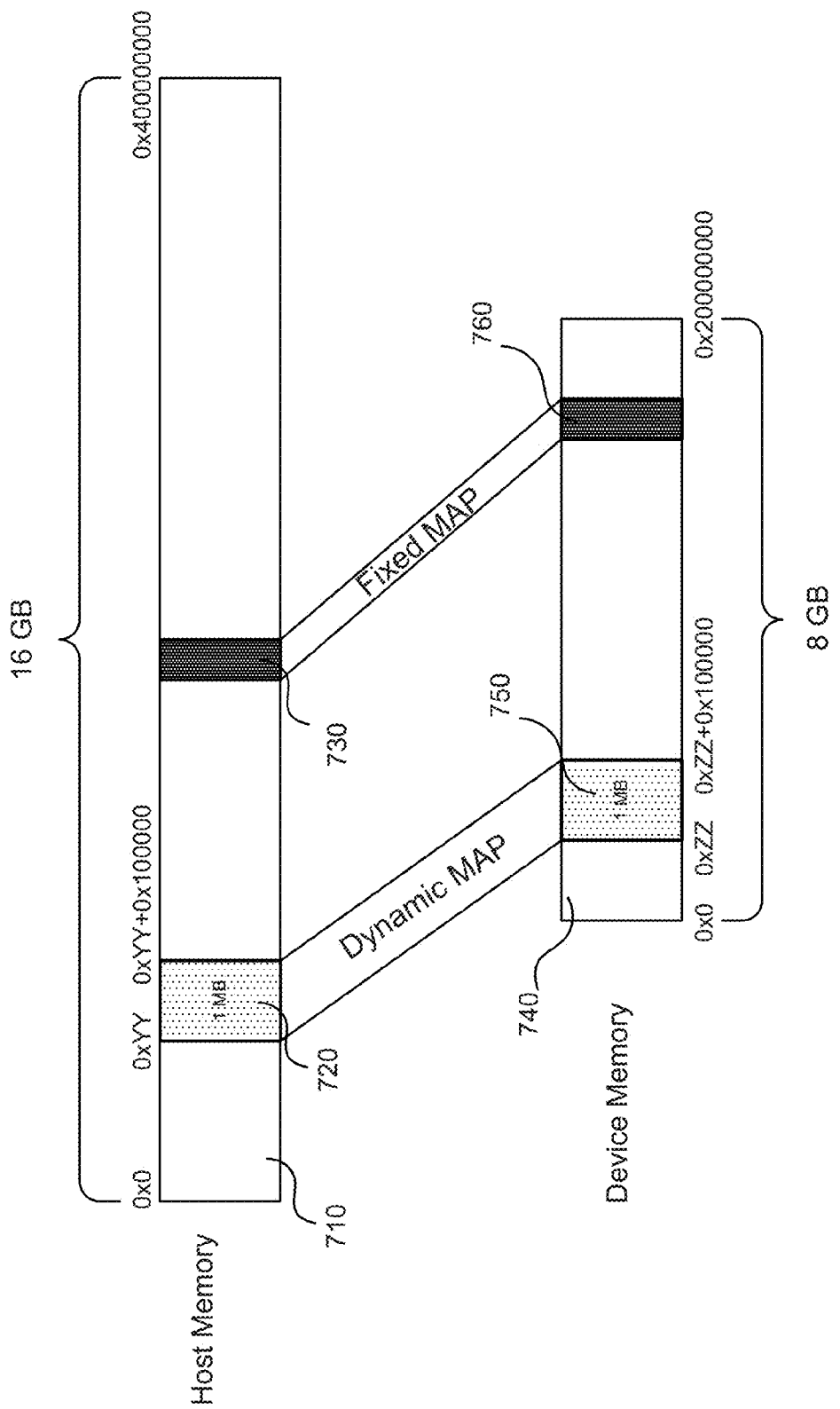
FIG. 7 illustrates an example of accessing a memory block in a device memory.
Figure 8:
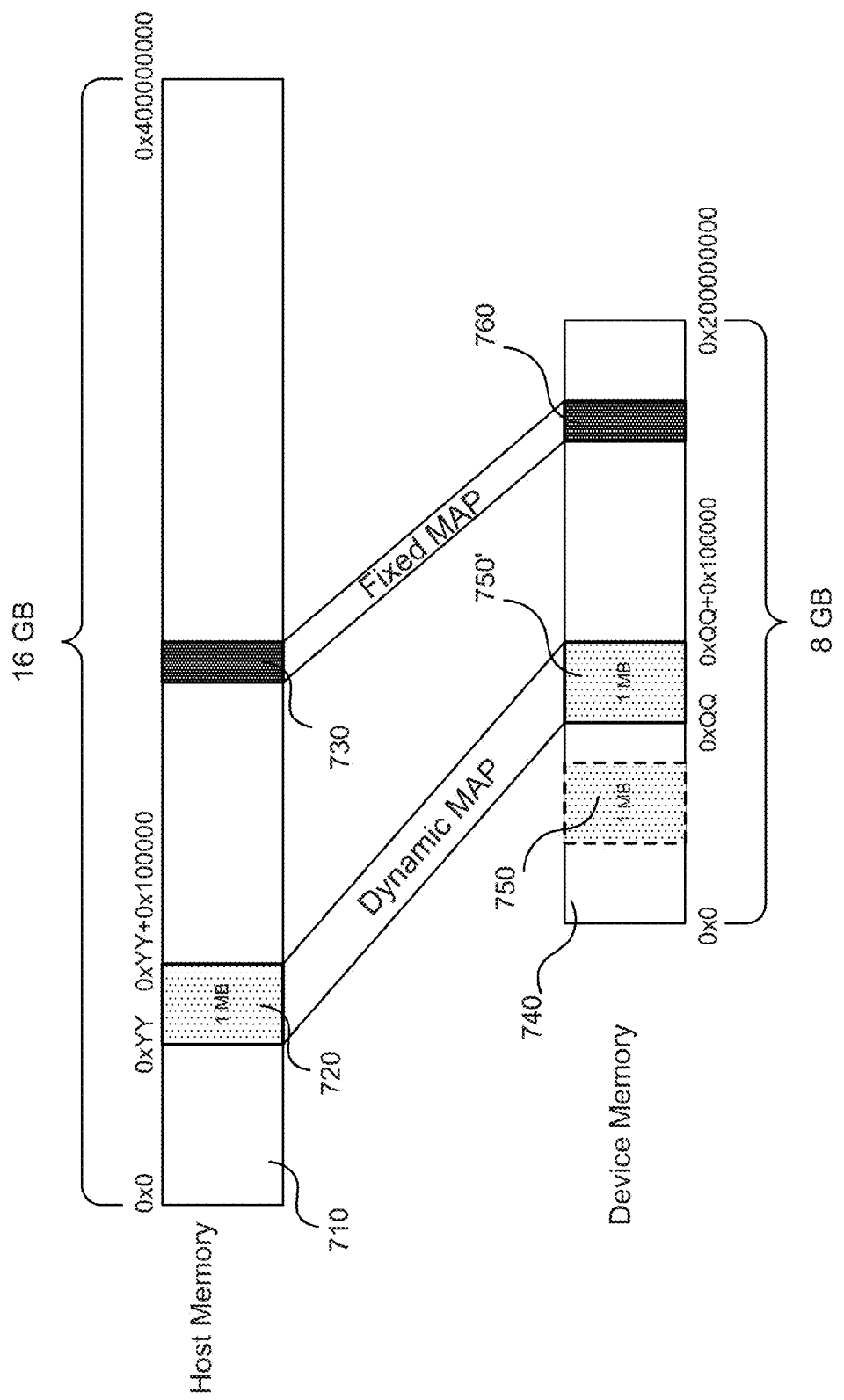
FIG. 8 illustrates an example of accessing a different memory block in the device memory.
Figure 9:
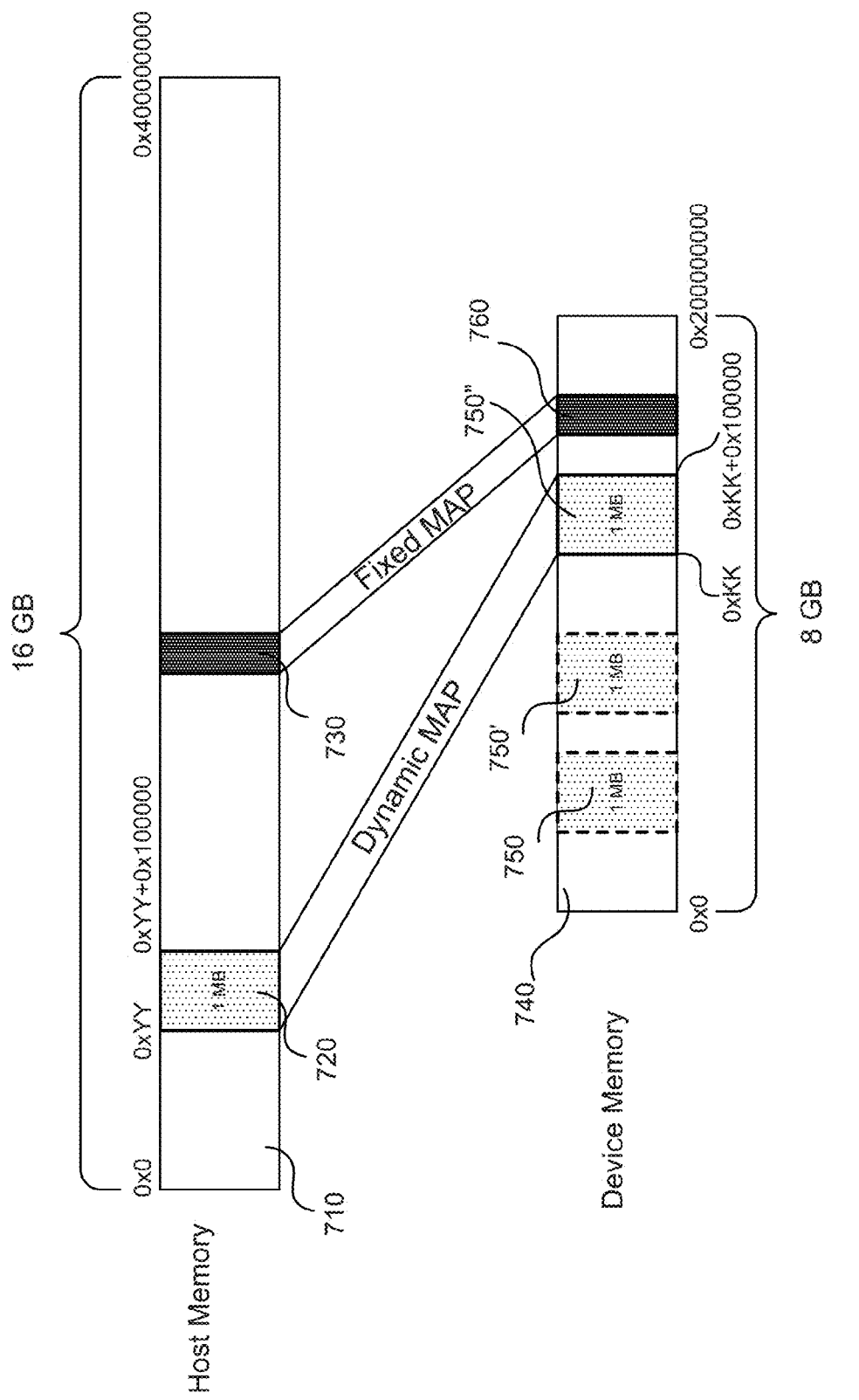
FIG. 9 illustrates another example of accessing a different memory block in the device memory.

FIGS. 7-9 illustrate an example method of accessing full memory space of a device without reserving a large memory space in a host memory. FIG. 7 illustrates an example of accessing a memory block 750 in a device memory 740. In FIG. 7, a host memory 710 is about 16 GBs and device memory 740 is about 8 GBs. During system initialization or enumeration, a memory block 720 of about 1 MB in host memory 710 and a corresponding memory block 750 of about 1 Mbyte in device memory 740 are reserved and mapped to each other. Memory block 720 starts at host memory address 0xYY and ends at host memory address 0xYY+0x100000, while memory block 750 starts at device memory address 0xZZ and ends at device memory address 0xZZ+0x100000. The starting address of the host memory address 0xYY of memory block 720 may be saved in a BAR in the device's configuration register. In addition, a small fixed memory-mapping control memory block 730 of a few bytes is reserved in host memory 710. Memory block 730 is mapped to control registers 760 of a memory-mapping unit on the device. In some embodiments, the starting address of memory block 730 may be saved in another BAR register of the device's configuration register. In some embodiments, memory block 720 and memory block 730 may share a same base address register based on a predetermined offset between memory block 720 and memory block 730.

To access memory block 750 on the device, the host uses reserved memory block 730 and a BAR for memory block 730 to set control registers 760 on the device, such that address 0xYY in the host memory space can be translated into address 0xZZ in the device memory space. In this way, the host may read/write memory block 720 as if it were actually reading or writing memory block 750 in device memory 740 as described above.

FIG. 8 illustrates an example of accessing a different memory block 750' in device memory 740. Memory block 750' starts at device memory address 0xQQ and is 1-Mbyte long. Because the BARs are fixed in device configuration register, memory block 750' is normally not accessible by the host using memory block 720 in host memory 710. In order to access memory block 750' in device memory 740 using memory block 720 in host memory 710, the host writes an appropriate value, such as, for example, an offset of 0xQQ-0xZZ, to memory block 730 in host memory 710, which effectively writes to control registers 760 in device memory 740, such that address 0xYY in the host memory space may be translated to address 0xQQ in the device memory space by the memory-mapping unit on the device. In this way, the host may read/write memory block 720 as if it were actually reading or writing memory block 750' in device memory 740 as described above.

FIG. 9 illustrates yet another example of accessing a different memory block 750" in device memory 740. Memory block 750" starts at device memory address 0xKK and is 1-MB long. Because the BARs are fixed in device configuration register and memory block 750" is not mapped to memory block 720, memory block 750" is normally not accessible by the host using memory block 720 in host memory 710. In order to access memory block 750" in device memory 740 using memory block 720 in host memory 710, the host writes a different value, such as, for example, an offset of 0xKK-0xZZ, into memory block 730 in host memory 710, which effectively writes to control registers 760 in device memory 740, such that address 0xYY in the host memory space may be translated to address 0xKK in the device memory space by the memory-mapping unit on the device. In this way, the host may read/write memory block 720 as if it were actually reading or writing memory block 750" in device memory 740 as described above.

Therefore, by writing to a small fixed memory-mapping control block of a few bytes, the host can modify the control registers of the internal memory-mapping unit of the device, which can thus translate a same memory address in the host memory space to different memory addresses in the device memory space using different values in the control registers of device's memory-mapping unit. This effectively maps a same memory block in a host memory to different memory blocks in a device memory. By writing appropriate values in the small fixed memory-mapping control block, the host can access any memory block in the device memory based on the same BAR value.

IV. METHODS

Figure 10:
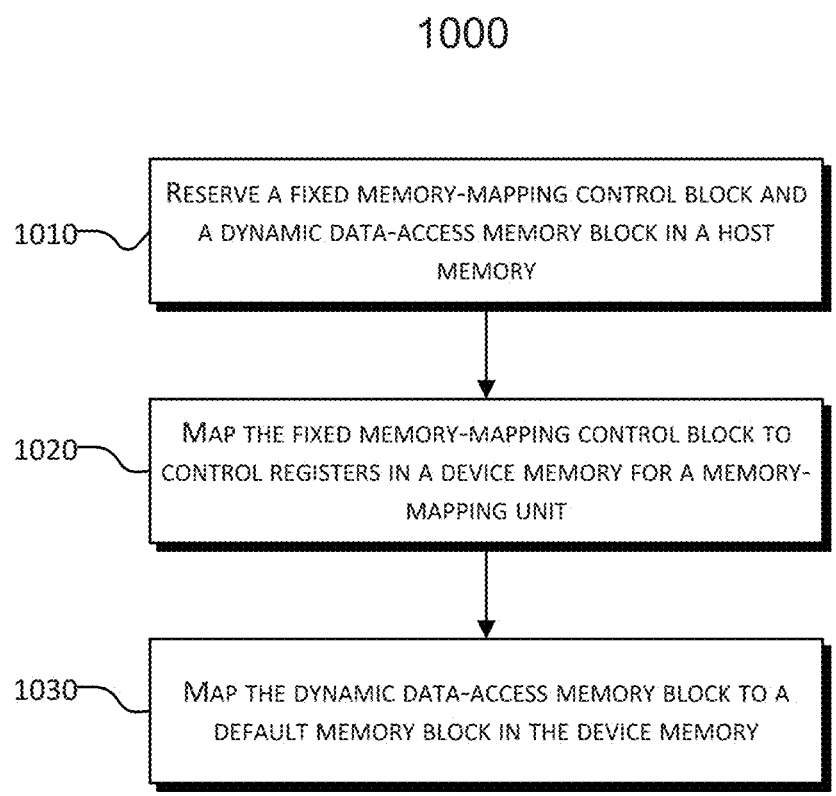
FIG. 10 illustrates a method of configuring a host memory and a device memory for full device memory access.

FIG. 10 is a flow chart illustrating a method of configuring a host memory and a device memory for full device memory access. At block 1010, a fixed memory-mapping control block and a dynamic data-access memory block are reserved in a host memory. The fixed memory-mapping control block may only include a few bytes, such as less than 8 bytes, less than 16 bytes, less than 32 bytes, less than 64 bytes, or less than 100 bytes. The dynamic data-access memory block may be a small size memory block, such as, for example, 1 MB, 2 MBs, 4 MBs, 8 MBs, 16 MBs or other size. At block 1020, the fixed memory-mapping control block in the host memory is mapped to control registers for a memory-mapping unit on the device, the control registers residing in a device memory or mapped into the device memory. Mapping the fixed memory-mapping control block at block 1020 may include sending information about the fixed memory-mapping control block to the device for setting a base address register in the device's configuration register, or setting a base address register for the fixed memory-mapping control block in the device's configuration register. At block 1030, the dynamic data-access memory block in the host memory is mapped to a default memory block in the device memory. Mapping the dynamic data-access memory block at block 1030 may include sending information about the dynamic data-access memory block to the device for setting another base address register in the device's configuration register, or setting a base address register for the dynamic data-access memory block in the device's configuration register. In some embodiments, one base address register may be set for mapping both the fixed memory-mapping control block and the dynamic data-access memory block based on an offset between the fixed memory-mapping control block and the dynamic data-access memory block. After the base address registers are set, the host may access the full memory space by accessing the fixed memory-mapping control block and the dynamic data-access memory block in the host memory as described below.

Figure 11:
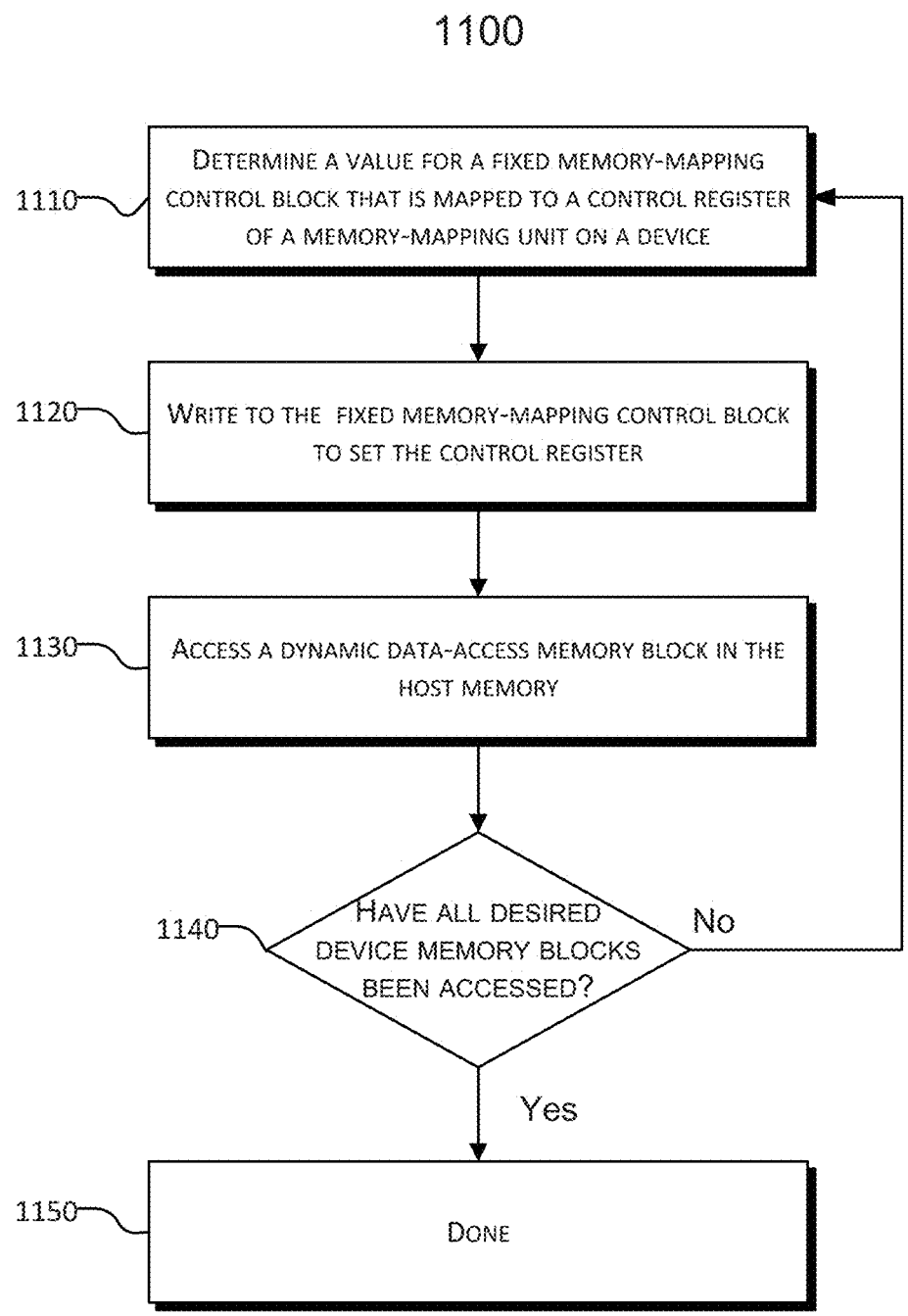
FIG. 11 illustrates a method of accessing a full device memory space without reserving a large memory space in a host memory.

FIG. 11 is a flow chart illustrating a method of accessing a full device memory space without reserving a large memory space in a host memory, according to some embodiments of the present disclosure. At block 1110, the host determines a value to write in a fixed memory-mapping control block in a host memory based at least partially on the memory address of a device memory block to be accessed by the host, where the fixed memory-mapping control block is mapped to control registers of a memory-mapping unit, such as an address translation unit, on a device. At block 1120, the host writes the determined value to the fixed memory-mapping control block, which effectively writes the determined value to the control registers of the memory-mapping unit on the device. At block 1130, the host accesses a dynamic data-access memory block in the host memory, where the address of the dynamic data-access memory block in the host memory is translated into a device memory address for a target device memory block, based at least partially on the value written into the control registers of the memory-mapping unit and a base address register for the dynamic data-access memory block. Thus, the dynamic data-access memory block in the host memory is effectively mapped to the target device memory block. At block 1140, it is determined whether all desired device memory blocks have been accessed. If the result at block 1140 is "YES", the process stops at block 1150. If the result at block 1140 is "NO", a new value is determined based on the address of another target device memory block to be accessed, and written into the fixed memory-mapping control block in the host memory to configure the control registers of the memory-mapping unit on the device. The memory-mapping unit translates the address of the dynamic data-access memory block in the host memory to a different device memory address, based at least partially on the new value written into the fixed memory-mapping control block in the host memory. The host can then access the dynamic data-access memory block in the host memory to effectively access the target device memory block at the different device memory address. Operations at blocks 1110-1140 may be performed iteratively until all desired device memory blocks have been accessed.

The above method can be used for all physical functions, such as function 0 246 to function N 248 of FIG. 2. As a result, any function can have a full access to the device memory. In some embodiments, a different memory-mapping unit may be used for each function such that each function can have a full access to the device memory independent of other functions.

V. EXAMPLES

The capability of accessing full device memory is very useful in many applications. For example, when a device failure occurs, a host may want to dump the full device memory into a host memory in order to debug the failure in the device. Using the methods disclosed herein, the host may download the full memory of the device one block at a time by changing the control registers of a memory-mapping unit on the device.

As another example, a host may want to control a hardware component on a device, such as an endpoint device, a switch or a bridge. With limited access to the device memory, control registers for some hardware components may not be accessible by the host. Using the methods disclosed herein, the host may change the value in control registers for a memory-mapping unit on the device such that the memory-mapping unit may translate an address within a reserved memory block in the host memory to an address corresponding to the control registers for the hardware component. In this way, the host may write to the reserved memory block in the host memory to change the control registers of the hardware component, thereby controlling the hardware component.

In some embodiments, a device memory block may be dynamically configured or unmapped by a host using the methods disclosed herein to prevent other devices from accessing one or more device memory blocks, such as for security reasons. For example, the host may configure a memory-mapping unit through control registers for the memory-mapping unit such that the memory-mapping unit would not translate any memory address to an address in the device memory falling within the one or more device memory blocks.

VI. COMPUTING SYSTEMS

Figure 12:
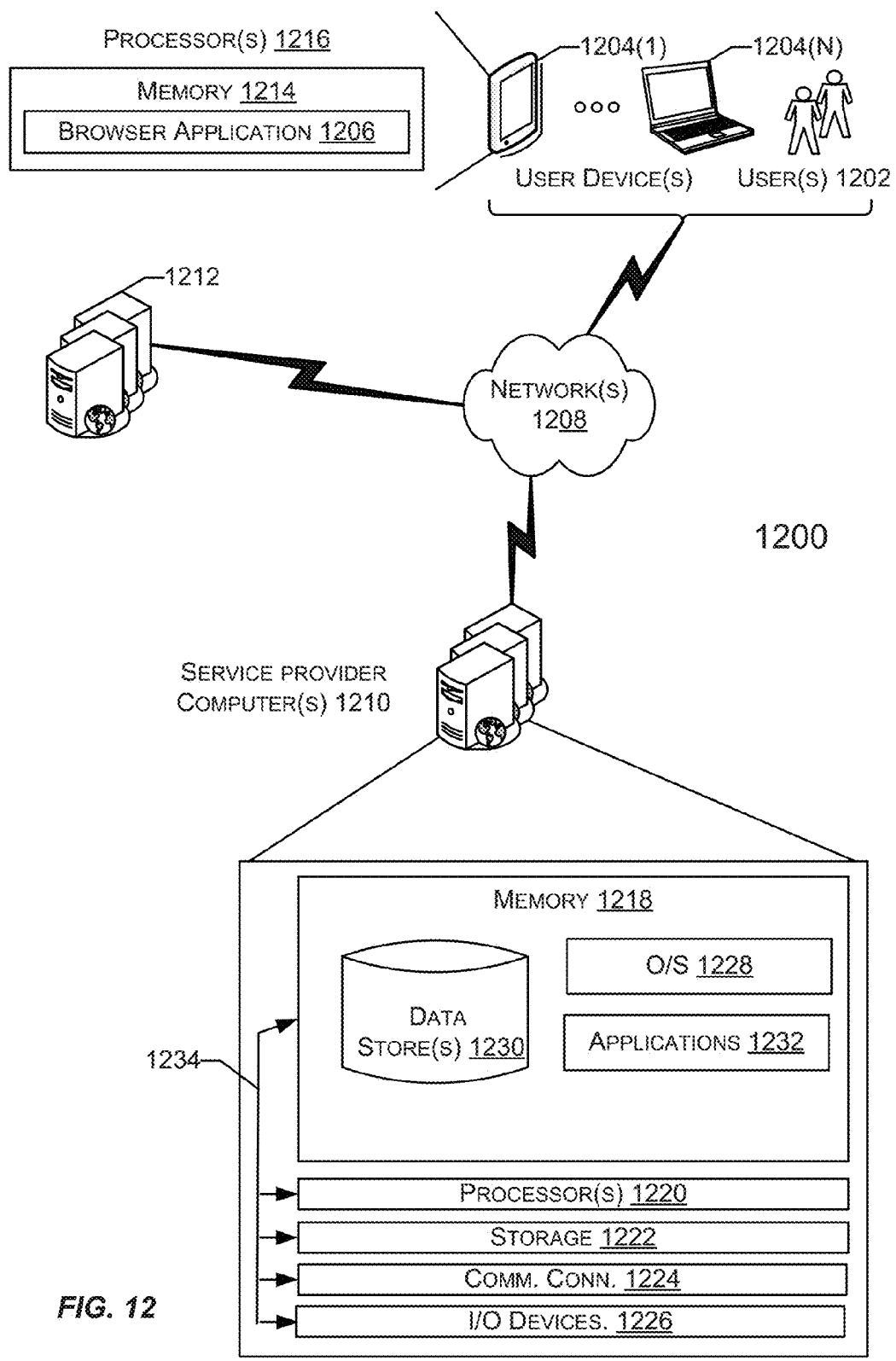
FIG. 12 illustrates an example architecture for features and systems described herein that includes one or more service provider computers and/or a user device connected via one or more networks, according to some embodiments.

FIG. 12 illustrates an example architecture for features and systems described herein that includes one or more service provider computers and/or a user device connected via one or more networks. The devices discussed in FIGS. 1-11 may use one or more components of the computing devices described in FIG. 12 or may represent one or more computing devices described in FIG. 12. In illustrated architecture 1200, one or more users 1202 may use user computing devices 1204(1)-(N) to access an application 1206 (e.g., a web browser or mobile device application), via one or more networks 1208. In some aspects, application 1206 may be hosted, managed, and/or provided by a computing resources service or service provider. One or more service provider computers 1210 may provide a native application that is configured to run on user devices 1204, which user(s) 1202 may interact with. Service provider computer(s) 1210 may, in some examples, provide computing resources such as, but not limited to, client entities, low latency data storage, durable data storage, data access, management, virtualization, cloud-based software solutions, electronic content performance management, and so on. Service provider computer(s) 1210 may also be operable to provide web hosting, computer application development and/or implementation platforms, combinations of the foregoing or the like to user(s) 1202. Service provider computer(s) 1210, in some examples, may communicate with one or more third party computers 1212.

In some examples, network(s) 1208 may include any one or a combination of many different types of networks, such as cable networks, the Internet, wireless networks, cellular networks and other private and/or public networks. While the illustrated example represents user(s) 1202 accessing an application 1206 over network(s) 1208, the described techniques may equally apply in instances where user(s) 1202 interact with the service provider computer(s) 1210 via user device(s) 1204 over a landline phone, via a kiosk or in some other manner. The described techniques may also apply in other client/server arrangements (e.g., set-top boxes, etc.), as well as in non-client/server arrangements (e.g., locally stored applications, etc.).

As described briefly above, application 1206 may allow user(s) 1202 to interact with service provider computer(s) 1210 to, for example, access web content (e.g., web pages, music, video, etc.). Service provider computer(s) 1210, which may be arranged in a cluster of servers or as a server farm, may host application 1206 and/or cloud-based software services. Other server architectures may also be used to host application 1206. Application 1206 may be capable of handling requests from many users 1202 and serving, in response, various item web pages. Application 1206 can provide any type of website that supports user interaction, including social networking sites, online retailers, informational sites, blog sites, search engine sites, news and entertainment sites, and so forth. As discussed above, the described techniques can similarly be implemented outside of application 1206, such as with other applications running on user device(s) 1204.

User device(s) 1204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1204 may be in communication with service provider computer(s) 1210 via network(s) 1208, or via other network connections. Additionally, user device(s) 1204 may be part of the distributed system managed by, controlled by, or otherwise part of service provider computer(s) 1210 (e.g., a console device integrated with service provider computers 1210).

In one illustrative configuration, a user device(s) 1204 may include at least one memory 1214 and one or more processing units (or processor(s) 1216). Processor(s) 1216 may be implemented in hardware, computer-executable instructions, firmware, or combinations thereof. Computer-executable instruction or firmware implementations of processor(s) 1216 may include computer-executable or machine-executable instructions written in any suitable programming language to perform the various functions described. User device(s) 1204 may also include geo-location devices (e.g., a global positioning system (GPS) device or the like) for providing and/or recording geographic location information associated with user device(s) 1204.

Memory 1214 may store program instructions that are loadable and executable on processor(s) 1216, as well as data generated during the execution of these programs. Depending on the configuration and type of user device(s) 1204, memory 1214 may be volatile (such as random access memory (RAM)) and/or non-volatile (such as read-only memory (ROM), flash memory, etc.). User device(s) 1204 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, memory 1214 may include multiple different types of memory, such as static random access memory (SRAM), dynamic random access memory (DRAM), or ROM.

Turning to the contents of memory 1214 in more detail, memory 1214 may include an operating system and one or more application programs or services for implementing the features disclosed herein including at least a user provided input element or electronic service web page, such as via a browser application 1206 or dedicated applications (e.g., smart phone applications, tablet applications, etc.). Browser application 1206 may be configured to receive, store and/or display a website or other interface for interacting with service provider computer(s) 1210. Additionally, memory 1214 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by user device 1204.

In some aspects, service provider computer(s) 1210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1210 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1210 may be in communication with user device(s) 1204 and/or other service providers via network(s) 1208, or via other network connections. Service provider computer(s) 1210 may include one or more servers, perhaps arranged in a cluster, as a server farm, or as individual servers not associated with one another. These servers may be configured as part of an integrated, distributed computing environment.

In one illustrative configuration, service provider computer(s) 1210 may include at least one memory 1218 and one or more processing units (or processor(s) 1220). Processor(s) 1220 may be implemented in hardware, computer-executable instructions, firmware, or combinations thereof. Computer-executable instruction or firmware implementations of processor(s) 1220 may include computer-executable or machine-executable instructions written in any suitable programming language to perform the various functions described.

In some instances, hardware processor(s) 1220 may be a single core processor or a multi-core processor. A multi-core processor may include multiple processing units within the same processor. In some embodiments, the multi-core processors may share certain resources, such as buses and second or third level of caches. In some instances, each core in a single or multi-core processor may also include multiple executing logical processors (or threads). In such a core (e.g., those with multiple logical processors), several stages of the execution pipeline and also lower level caches may also be shared.

Memory 1218 may store program instructions that are loadable and executable on processor(s) 1220, as well as data generated during the execution of these programs. Depending on the configuration and type of service provider computer(s) 1210, memory 1218 may be volatile (such as RAM) and/or non-volatile (such as ROM, flash memory, etc.). Service provider computer(s) 1210 or servers may also include additional storage 1222, which may include removable storage and/or non-removable storage. Additional storage 1222 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, memory 1218 may include multiple different types of memory, such as SRAM, DRAM, or ROM.

Memory 1218 and additional storage 1222, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. Memory 1218 and additional storage 1222 are all examples of computer storage media. Additional types of computer storage media that may be present in service provider computer(s) 1210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1210. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1210 may also contain communications connection(s) 1224 that allow the service provider computer(s) 1210 to communicate with a stored database, another computing device or server, user terminals and/or other devices on network(s) 1208. Service provider computer(s) 1210 may also include I/O device(s) 1226, such as a keyboard, a mouse, a pen, a voice input device, a touch input device, a display, speakers, a printer, and the like.

Communication connection(s) 1224 and I/O device(s) 1226, along with storage 1222, may be described as peripheral devices.

Memory 1218 may include an operating system 1228, one or more data stores 1230 and/or one or more application programs 1232 or services for implementing the features disclosed herein.

Service provider computer(s) 1210 may also include one or more communication channels 1234. A communication channel 1234 may provide a medium over which the various components of service provider computer 1210 can communicate. communication channel or channels 1234 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

Figure 13:
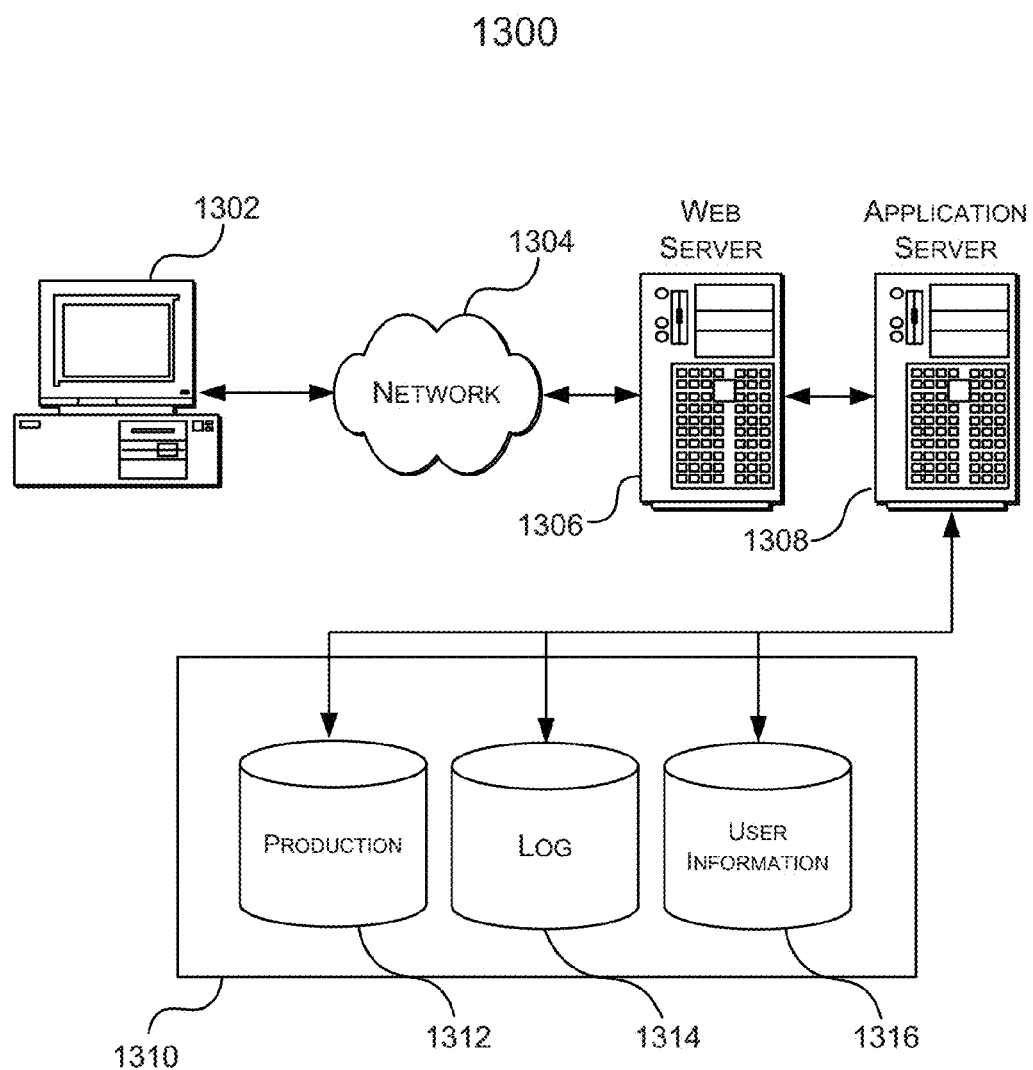
FIG. 13 illustrates an environment in which various embodiments of the present disclosure can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between c client device 1302 and c application server 1308, can be handled by the Web server. It should be understood that the Web and application servers are not required and are merely example components, as structured code discussed herein can be executed on any appropriate device or host machine as discussed elsewhere herein.

Data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in data store 1310. Data store 1310 is operable, through logic associated therewith, to receive instructions from application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of accessing a target memory block in a memory of a Peripheral Component Interconnect (PCI) device by a host, the method comprising:
   reserving a fixed memory-mapping control block in a host memory on the host;
   mapping the fixed memory-mapping control block to a control register of a memory-mapping unit on the PCI device;
   reserving a dynamic data-access memory block in the host memory;
   mapping the dynamic data-access memory block to a default memory block in the memory of the PCI device;
   determining a value for the fixed memory-mapping control block based on an address of the target memory block in the memory of the PCI device;
   writing the determined value into the fixed memory-mapping control block; and
   accessing the dynamic data-access memory block to access the target memory block.

2. The method of claim 1, wherein the PCI device includes one of a PCIe endpoint, a PCIe switch, or a PCIe bridge.

3. The method of claim 1, wherein the fixed memory-mapping control block is less than 100 bytes.

4. The method of claim 1, wherein:
   mapping the fixed memory-mapping control block includes setting a first base address register in a configuration register of the PCI device based on an address of the fixed memory-mapping control block, and
   mapping the dynamic data-access memory block includes setting a second base address register in the configuration register of the PCI device based on an address of the dynamic data-access memory block.

5. A method of transferring data between a host and a PCI device, the method comprising:
   mapping a fixed memory-mapping control block in a host memory of the host to a control register of a memory-mapping unit of the PCI device;
   mapping a dynamic data-access memory block in the host memory to a default memory block in a memory of the PCI device, wherein the memory-mapping unit of the PCI device translates an address between the dynamic data-access memory block and a memory block in the memory of the PCI device; and
   dynamically modifying a value in the control register of the memory-mapping unit through the fixed memory-mapping control block such that an address of the dynamic data-access memory block in the host memory is translated to a different address in the memory of the PCI device based on the modified value in the control register of the memory-mapping unit.

6. The method of claim 5, further comprising:
   determining a value for the fixed memory-mapping control block based on an address of a target memory block in the memory of the PCI device;
   writing the determined value into the fixed memory-mapping control block; and
   accessing the dynamic data-access memory block to access the target memory block in the memory of the PCI device.

7. The method of claim 6, wherein accessing the dynamic data-access memory block includes reading from the dynamic data-access memory block and writing into the dynamic data-access memory block.

8. The method of claim 6, wherein determining the value for the fixed memory-mapping control block, writing the determined value into the fixed memory-mapping control block, and accessing the dynamic data-access memory block are performed iteratively until all target memory blocks in the memory of the PCI device have been accessed.

9. The method of claim 5, wherein the PCI device includes one of a PCIe endpoint, a PCIe switch, or a PCIe bridge.

10. The method of claim 5, wherein the fixed memory-mapping control block is less than 100 bytes.

11. The method of claim 5, wherein mapping the fixed memory-mapping control block and mapping the dynamic data-access memory block include setting a base address register in a configuration register of the PCI device based on an address of the fixed memory-mapping control block or an address of the dynamic data-access memory block.

12. The method of claim 5, wherein:
   mapping the fixed memory-mapping control block includes setting a first base address register in a configuration register of the PCI device based on an address of the fixed memory-mapping control block; and mapping the dynamic data-access memory block includes setting a second base address register in the configuration register of the PCI device based on an address of the dynamic data-access memory block.

13. The method of claim 5, further comprising:
determining a value for the fixed memory-mapping control block based on an address of a control register for a hardware component on the PCI device;
writing the determined value into the fixed memory-mapping control block; and
accessing the dynamic data-access memory block to configure the control register for the hardware component on the PCI device.

14. The method of claim 5, wherein the dynamic data-access memory block is smaller than the memory of the PCI device.

15. The method of claim 5, wherein the dynamic data-access memory block is no larger than 16 megabytes.

16. A computer system, comprising:
a host including a host memory;
a PCI device including a device memory and a memory-mapping unit; and
a PCI bus electrically coupling the PCI device to the host;
wherein a fixed memory-mapping control block in the host memory is mapped to a control register for the memory-mapping unit of the PCI device;
wherein a dynamic data-access memory block in the host memory is mapped to a default memory block in the device memory of the PCI device; and
wherein the memory-mapping unit of the PCI device translates an address between the dynamic data-access memory block and a memory block in the device memory of the PCI device.

17. The computer system of claim 16, wherein the PCI device includes one of a PCIe endpoint, a PCIe switch, or a PCIe bridge.

18. The computer system of claim 16, wherein the fixed memory-mapping control block is less than 100 bytes.

19. The computer system of claim 16, wherein a base address register in a configuration register of the PCI device includes a start address of the fixed memory-mapping control block or a start address of the dynamic data-access memory block.

20. The computer system of claim 19, wherein the dynamic data-access memory block is no larger than 16 megabytes.

* * * * *

UNITED STATES PATENT AND TRADEMARK OFFICE
CERTIFICATE OF CORRECTION

PATENT NO. : 9,804,988 B1
APPLICATION NO. : 14/928990
DATED : October 31, 2017
INVENTOR(S) : Hani Ayoub, Adi Habusha and Ronen Shitrit It is certified that error appears in the above-identified patent and that said Letters Patent is hereby corrected as shown below:

On the Title Page

Item (72):
Please delete "Ronen Shitrit, Kiryay Atat (IL)" and add "Ronen Shitrit, Kiryat Ata (IL)"

Signed and Sealed this
Twenty-fourth Day of April, 2018

Andrei Iancu
*Director of the United States Patent and Trademark Office*